United States Patent
Wang et al.

(10) Patent No.: US 7,738,880 B2
(45) Date of Patent: Jun. 15, 2010

(54) PROVISION OF LOCATION SERVICE APPARATUS

(75) Inventors: Ling Wang, Espoo (FI); Ville Ruutu, Espoo (FI); Sakari Angervuori, Helsinki (FI); Veli-Matti Teittinen, Espoo (FI); Harri Meskanen, Helsinki (FI)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 10/240,780

(22) PCT Filed: Jan. 23, 2001

(86) PCT No.: PCT/EP01/00732

§ 371 (c)(1),
(2), (4) Date: Apr. 3, 2003

(87) PCT Pub. No.: WO01/78433

PCT Pub. Date: Oct. 18, 2001

(65) Prior Publication Data

US 2003/0157939 A1   Aug. 21, 2003

(51) Int. Cl.
*H04W 24/00* (2009.01)
(52) U.S. Cl. .................................................. 455/456.1
(58) Field of Classification Search ................ 455/446, 455/423, 67.16, 442, 436, 63, 62, 457, 456, 455/422, 424, 435, 466, 556.1, 456.1–456.5, 455/97.16, 438, 422.1, 435.1
See application file for complete search history.

(56) References Cited

U.S. PATENT DOCUMENTS

| 5,465,390 A * | 11/1995 | Cohen ...................... 455/446 |
| 5,574,466 A | 11/1996 | Reed et al. |
| 5,826,218 A * | 10/1998 | Khafizov et al. ............ 702/179 |
| 5,963,867 A | 10/1999 | Reynolds et al. |
| 6,173,186 B1 * | 1/2001 | Dalley ...................... 455/446 |
| 6,539,221 B1 * | 3/2003 | Vasudevan et al. .......... 455/423 |
| 6,603,976 B1 * | 8/2003 | Amirijoo et al. ......... 455/456.1 |
| 6,640,089 B1 * | 10/2003 | Kanaan et al. ........... 455/67.16 |

* cited by examiner

FOREIGN PATENT DOCUMENTS

WO   WO 99/53707   10/1999

OTHER PUBLICATIONS

ETSI TS 101 724 v7.2.1: Digital Cellular Telecommunications System (Phase 2+); Location Services (LCS); (Functional description)—Stage 2 (GSM 03.71 version 7.2.1 Release 1998), European Telecommunication Standard, Jan. 2000, pp. 1-105.

*Primary Examiner*—Melody Mehrpour
(74) *Attorney, Agent, or Firm*—Squire, Sanders & Dempsey, LLP (57) ABSTRACT

The present invention relates to selection of sites of a communication system for measurement units that are for measuring a feature of wireless signals so that the location of a wireless station may be determined based on the measurement. Each measurement unit provides a measurement coverage. In the method a first set of information is defined, said first set relating to sites that are possible locations for the location measurement units and to the coverage provided by the site if it is provided with a measurement unit. A second set of information is defined that relates to signalling environment within the sites. Based on the defined first and second sets of information, a third set of information is defined, said third set associating each site with access entities of the communication system. Based on the third set of information, appropriate sites can be selected for the location measurement units.

47 Claims, 5 Drawing Sheets

| | Site 1 | | | Site 2 | | | Site 3 | | |
|---|---|---|---|---|---|---|---|---|---|
| | Cell 1 | Cell 2 | Cell 3 | Cell 1 | Cell 2 | Cell 3 | Cell 1 | Cell 2 | Cell 3 |
| Site 1 | x | x | x | -75 | -70 | -68 | -75 | -70 | -68 |
| Site 2 | -75 | -70 | -68 | x | x | x | -85 | -90 | -88 |
| Site 3 | -75 | -77 | -68 | -95 | -110 | -108 | x | x | x |
| ..... | | | | | | | | | |

Fig. 3a

| | Site 1 | Site 2 | Site 3 |
|---|---|---|---|
| Site 1 | x | L | N |
| Site 2 | L | x | L |
| Site 3 | N | L | x |
| ... | | | |

| BTS | 1 | 2 | 3 | 4 | 5 | 6 | 7 | 8 | 9 | 10 | LMU site | Net Cov 1 |
|---|---|---|---|---|---|---|---|---|---|---|---|---|
| 1 | x |   | x | x |   |   |   | x |   |   |   | 4 |
| 2 | x | x | x | ■ | x | ■ | x | ■ | ■ | ■ | s | 5 |
| 3 | x |   | x |   | x |   | x | x |   |   |   | 5 |
| 4 | x | x |   | x | x |   |   |   |   | x |   | 5 |
| 6 |   | x | x |   |   | x | x | x |   |   |   | 5 |
| 7 |   | x |   |   | x | x | x |   |   |   |   | 4 |
| 8 |   |   | x |   | x |   | x |   |   |   |   | 3 |
| 9 | x |   | x |   |   |   |   |   | x |   |   | 3 |
| 10 |   |   |   | x | x |   |   |   |   | x |   | 3 |

Fig. 5a

| BTS | 1 | 2 | 3 | 4 | 5 | 6 | 7 | 8 | 9 | 10 | LMU site | Net Cov1 | Net Cov2 |
|---|---|---|---|---|---|---|---|---|---|---|---|---|---|
| 1 | x |   | x | x |   |   |   | x |   |   |   | 4 | 2 |
| 2 | x | x | x | ■ | x |   | x |   | ■ |   | s | 5 |   |
| 3 | x |   | x | ■ |   | x |   | x | x |   | s | 5 | 3 |
| 4 | x | x |   | x | x |   |   |   |   | x |   | 5 | 3 |
| 6 |   | x | x |   |   | x | x | x |   |   |   | 5 | 2 |
| 7 |   | x |   |   | x | x | x |   |   |   |   | 4 | 1 |
| 8 |   |   | x |   | x |   | x |   |   |   |   | 3 | 2 |
| 9 | x |   | x |   |   |   |   |   | x |   |   | 3 | 1 |
| 10 |   |   |   | x | x |   |   |   |   | x |   | 3 | 2 |

Fig. 5b

| BTS | 1 | 2 | 3 | 4 | 5 | 6 | 7 | 8 | 9 | 10 | LMU site | Net Cov 1 | Net Cov 2 | Net Cov 3 |
|---|---|---|---|---|---|---|---|---|---|---|---|---|---|---|
| 1 | x |   | x | x |   |   |   | x |   |   |   | 4 | 2 | 1 |
| 2 | x | x | x |   | x |   | x |   |   |   | s | 5 |   |   |
| 3 | x |   | x |   |   | x |   | x | x |   | s | 5 | 3 |   |
| 4 | x | x |   | x | x |   |   |   |   | x | s | 5 | 3 | 2 |
| 6 |   | x | x |   |   | x | x | x |   |   |   | 5 | 2 | 1 |
| 7 |   | x |   |   | x | x | x |   |   |   |   | 4 | 1 | 0 |
| 8 |   |   | x |   | x |   | x |   |   |   |   | 3 | 2 | 0 |
| 9 | x |   | x |   |   |   |   |   | x |   |   | 3 | 1 | 0 |
| 10 |   |   |   | x | x |   |   |   |   | x |   | 3 | 2 | 2 |

PROVISION OF LOCATION SERVICE APPARATUS

FIELD OF THE INVENTION

The present invention relates to provision of location service apparatus, and in particular, but not exclusively, to positioning of measurement apparatus for a location service that is implemented in association with a telecommunications system.

BACKGROUND OF THE INVENTION

A cellular telecommunications system is based around cells or similar radio access and/or service areas. Examples of cellular telecommunications systems include standards such as the GSM (Global System for Mobile communications) or various GSM based systems (such as GPRS: General Packet Radio Service), AMPS (American Mobile Phone System) or DAMPS (Digital AMPS) or WCDMA (Wideband Code Division Multiple Access) and TDMA/CDMA (Time Division Multiple Access/Code Division Multiple Access) in UMTS (Universal Mobile Telecommunications System), IMT 2000 and so on.

In cellular systems, a base transceiver station (BTS) serves mobile stations (MS) or similar wireless user equipment (UE) via an air or radio interface. A base station provides a radio access entity that is typically but not exclusively referred to as a cell. The approximate location, size and shape of a cell is known, each of the cells covering a particular geographical area. The size and shape of the cells may vary from cell to cell. Several cells may also be grouped together to form a larger service area. Each of the cells can be controlled by an appropriate controller apparatus. The various controllers of a cellular network may be interconnected and there may be one or more gateway nodes connecting the cellular network e.g. to a public switched telephone network (PSTN) and other communication networks such as to the Internet and/or other packet switched networks. A geographical area may be served by more than one base stations. The mobile station may also be in communication with two or more base stations of the system at the same time. The two or more base stations may be connected to the same controller or different controllers.

The cellular communication network apparatus can also be employed for provision of location information concerning a mobile station and the user thereof. More particularly, the cells or similar geographically limited radio access entities facilitate the cellular telecommunications system to produce at least a rough location information estimate concerning the current geographical location of a mobile station, as the cellular telecommunications system is aware of the cell with which a mobile station currently associates. Therefore it is possible to conclude from the location of the cell the geographical area in which the mobile station is likely to be at a given moment. This information is available also when the mobile station is located within the coverage area of a visited or "foreign" network. The visited network may be capable of transmitting location information of the mobile station back to the home network, e.g. to support location services or for the purposes of call routing and charging.

The management of the location service may be provided by a separate network element such as a location server which is adapted to receive information from the telecommunication system.

The location information may be based on information of e.g. the current cell identity. If no further computations and/or approximations are made, this would give the location to an accuracy of one cell, i.e. it would indicate that the mobile station is (or at least was) within the coverage area of a certain cell. However, more accurate information concerning the geographical location of a mobile station may be desired. For example, the United States Federal Communication Commission (FCC) has mandated that wireless service providers have to implement location technologies that can locate wireless phone users who are calling to E911 emergency centre. The FCC has also defined certain accuracy requirements for the location.

Although the FCC order is directed to emergency caller location, other (commercial and non-commercial) uses for mobile systems, such as fleet management, location-dependent billing and navigation, and various advertisement schemes might also find more accurate location information useful. The possible applications include different local advertisement and information distribution schemes (e.g. transmission of information directed to those mobile users only who are currently within a certain area), area related WWW-pages (such as time tables, local restaurant, shop or hotel guides, maps local advertisements etc.) for the users of mobile data processing devices, and tracking of mobile users by anyone who wishes to receive this information and is legally entitled to obtain it. It should be appreciated that the above are only examples and there are several other possible commercial and non-commercial applications which may use the location information provided by the location service (LCS).

More accurate location information may be obtained e.g. by calculating the geographical location from range measurements or range difference (RD) measurements. More particularly, the reliability of the location determination may be improved by utilising results of measurements which define the travel time (or travel time differences) of the radio signal sent by the mobile station to the base station. The measurements are accomplished by a number (preferably at least three) base stations covering the area in which the mobile station is currently located. The measurement by each of the base stations gives the distance (range) between the base station and the mobile station or distance difference (range difference) between the mobile station and two base stations. Possible measurement errors may be corrected by an appropriate method. It should be appreciated that other measurements may also form the base for the location estimation.

Each of the range measurements generates a circle that is centred at the measuring base station. The mobile station can then be determined to be located at an intersection of the circles. The range difference measurement by two base stations creates a hyperbola. Observed time difference (OTD), E-OTD (Enhanced OTD) and time difference of arrival (TDOA) are mentioned herein as examples of technologies that are based on RD measurements.

In the E-OTD location method the mobile station (MS) measures the Observed Time Difference (OTD) between the arrivals of bursts from the serving (BTS 1) and neighbour base stations (BTS 2). The OTD value consists of two components:

$$OTD = RTD + GTD \qquad [1]$$

In equation [1] the RTD (Real Time Difference) is the synchronisation difference between two base stations. It describes how much earlier or later a base station transmits than another base station. If the network is synchronised, the RTDs should be zero. The GTD (Geometric Time Difference) is the component that is due to different propagation times (i.e. distances) between the mobile station MS and the two base stations. This is the actual quantity that includes information about the location:

$$GTD=[d(MS,BTS2)-d(MS,BTS1)]/c \qquad [2]$$

where $d(MS,BTSx)$ is the distance between the MS and BTS x, and c is the speed of light.

The above equation [2] determines a hyperbola, which is the curve of possible locations for a mobile station MS observing a constant GTD value between the two base stations BTS at known positions. When there are at least two such hyperbolas available (i.e. one serving and two neighbouring BTS sites are used for the measurements), the location estimate can be found at the intersection of the hyperbolas (see FIG. 1). If more E-OTD values are available then the possible location area can be more accurately be deduced.

A cellular network, such as for example a GSM network may not be synchronised. Thus the Real Time Difference (RTD) between the different base stations must be known in order to be able to locate a mobile station MS based on E-OTD measurements. The RTD values are typically measured by E-OTD Location Measurement Units (E-OTD LMU) located in the network. Therefore an implementation of an Enhanced Observed Time Difference (E-OTD) method for the Location Services (LCS) in a GSM network may require use of Location Measurement Units (LMUs) or similar entities. The LMU may be positioned either independently from the base station sites or co-site with a base station BTS.

The right positioning of the LMUs may have a significant effect on the performance of the LCS system and thus the positioning of the LMUs has to be carefully planned. The work of LMU position planning can be done by network planning tools during the network planning phase.

A cellular telecommunications network typically includes hundreds or even thousands of base station sites. Therefore it may be difficult to do the LMU position planning manually. It may also be very difficult to get the optimised positions for the LMU sites. The implementation and running of the LMUs cause costs for the operators of the communication networks. Therefore it could be advantageous to be able to minimise the amount of the LMUs in the network. Hence an automatic and/or optimised LMU position planning process might be useful.

SUMMARY OF THE INVENTION

It is an aim of the embodiments of the present invention to address one or several of the disadvantages and/or shortcomings of the prior art proposals for the location measurement unit site planning.

According to one aspect of the present invention, there is provided a method for defining sites for measurement units in a communication system, each of the measurement units providing a measurement coverage, the method comprising: defining a first set of information that relates to one or more of the sites that are possible locations for the location measurement units and the coverage provided by at least one of the sites if it is provided with a measurement unit; defining a second set of information that relates to signalling conditions within the coverage of the one or more sites; based on the defined first and second sets of information, defining a third set of information that associates at least one of the possible sites with access entities of the communication system that are covered by said possible site; and based on the third set of information, selecting sites for the location measurement units such that a predefined coverage is achieved.

According to another aspect of the present invention there is provided a planning tool for defining sites for measurement units in a communication system, each of the measurement units providing a measurement coverage, the planning tool comprising: information storage means; first processor means for defining a first set of information that relates to one or more sites that are possible locations for the location measurement units and to the coverage provided by at least one of the sites if it is provided with a measurement unit; second processor means for defining a second set of information that relates to signalling conditions within the coverage of the one or more sites; third processor means for defining, based on the first and second sets of information, a third set of information that associates at least one of the possible sites with access entities of the communication system that are covered by said possible sites; and fourth processor means for selecting, based on the third set of information, sites for the location measurement units such that a predefined coverage is achieved.

The selection of the sites may comprise the step of computing a measurement. coverage for each of the possible sites, based on which at least one site may be selected, where after information of the selected site is stored in the information storage unit. The selection of the sites may comprise further steps of computing a net measurement coverage value for each of the non-selected possible sites. The computing of the net measurement coverage value for a particular site may be accomplished by subtracting the measurement coverage of the selected sites that overlaps with the measurement coverage of the particular site from the entire measurement coverage of the particular site, after which at least one site among the non-selected sites is selected and information of the selected site is stored. The net measurement coverage value computation may be repeated until a predefined overall coverage by the selected sites is achieved.

The selection of the sites may alternative comprise steps for initiating the selection by defining an integer N that indicates the number of sites that is assumed to be required for a predefined measurement coverage, for selecting a combination of N sites and for determining if the selected combination provides the predefined coverage. The selection process may be repeated until a combination of N sites is found that provides the predefined measurement coverage or all possible combinations of N sites have been considered. If all possible combinations of N sites have been considered witjou obtaining an appropriate solution, the N may be incremented by a predefined integer and the selection process is started from the beginning based on the incremented N value.

The first set of information may comprise one or more of the following: information about the communication system; co-ordinates of the sites; type of the transmitter and/or receiver apparatus used by the sites; identities of the sites; information of any site that is excluded from the possible sites; information about possible cells of the communication system; information about the capacity or other characteristics of the measurement unit; information about the radius of the measurement unit coverage; information of a threshold level for a cell measurement value.

The second set of information may comprise information of one or more of the following: signal levels at each of the possible sites from all cells of the communication system; interference levels at each of the possible sites from all cells of the communication system; line of sight condition between the possible sites.

The third set of information may comprise a list of possible sites for a measurement unit and a list of cells that have been measured for each of the possible sites.

The embodiments of the invention may provide a method for implementing location service that may optimise the required location service apparatus. The embodiments may provide a solution for selecting BTS sites with a LMU (location measurement unit) so that the number of LMU sites is optimal to cover the whole radio network or the portion of the area of interest.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
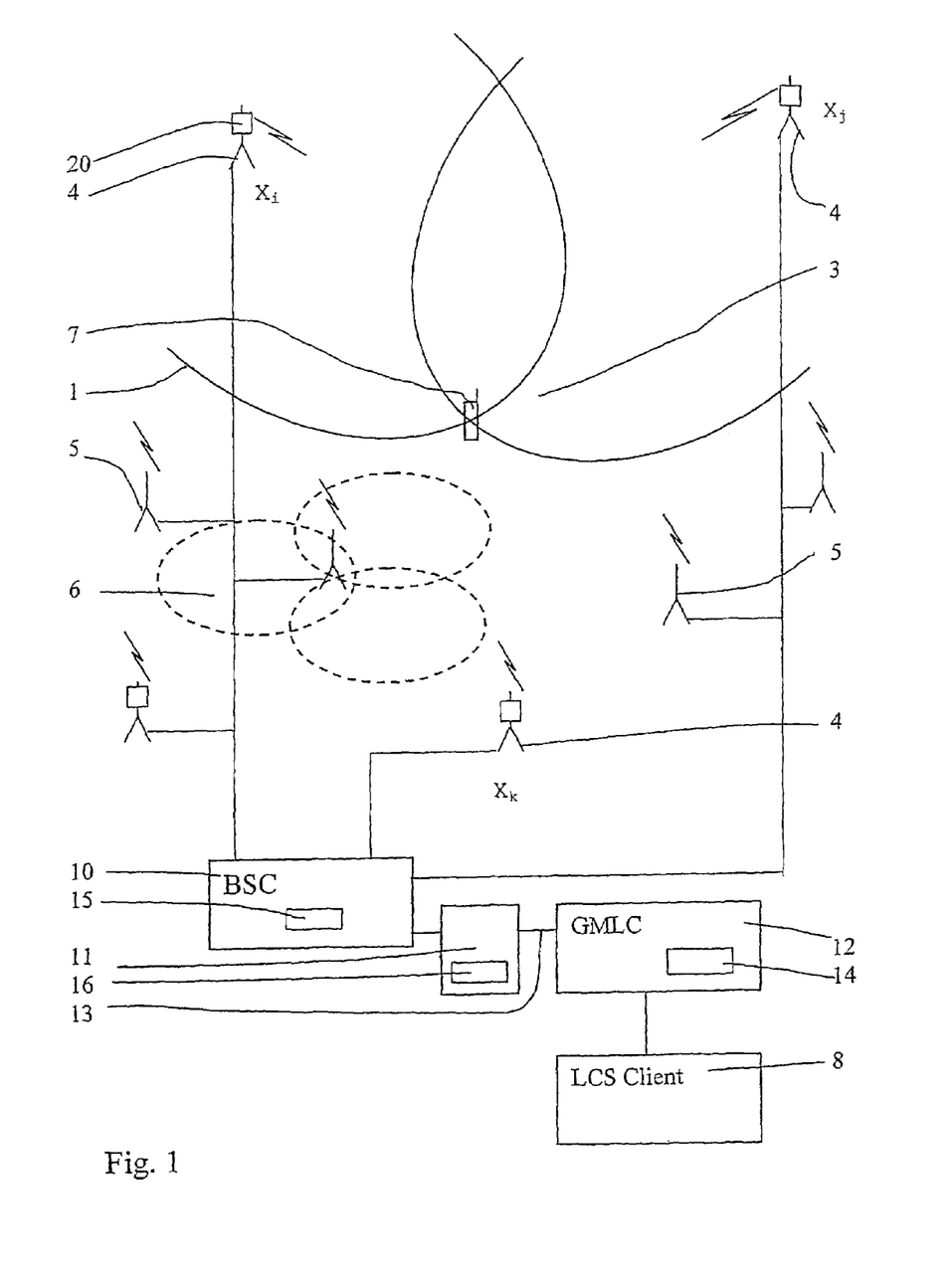
FIG. 1 shows an exemplifying network in which the embodiments of the present invention may be used.

Reference will first be made to FIG. 1 in which a number of base stations 4 and 5 provide radio coverage areas or cells of a cellular telecommunications network. Even though the exemplifying telecommunications network shown and described in more detail uses the terminology of the GSM (Global System for Mobile telecommunications) public land mobile network (PLMN), it should be appreciated that the proposed solution can be used in any cellular system, such as in the 3$^{rd}$ generation WCDMA (Wideband Code Division Multiple Access) UMTS (Universal Mobile Telecommunications System) or IMT 2000 system that provides communications between a mobile station and a base station and some kind of location information service that is based on use of location measurement units.

A base station (BTS) may serve one or more cells 6 or similar access entities. For clarity reasons, FIG. 1 shows only three cells 6, the service area thereof being indicated by a dashed line. It should be appreciated that typically most of the service area or the entire service area of a cellular network is covered by the cells. Each base station is arranged to transmit signals to and receive signals from the mobile station (MS) 7. Likewise, the mobile station 7 is able to transmit signals to and receive signals from the respective base station. The mobile station 7 accomplishes this via wireless communication with the base stations. Typically a number of mobile stations will be in communication with each base station although only one mobile station is shown in FIG. 1 for clarity. The mobile station 7 is able to move within the cell and also from one cell coverage area to another cell coverage area.

The location of the mobile station 7 may thus vary in time as the mobile station is free to move within the service area of the system.

Each of the base stations may provide an omni-directional radio coverage area or a sector radio beam provided with a directional or sector antenna (not shown). The sector base station may use e.g. three 120° directional antennae whereby three radio coverage areas are provided, or four 90° directional antennas providing four radio coverage areas and so on, or any combinations of different radio coverage beam widths. It should also be appreciated that base stations may sometimes be referred to as node B (e.g. in the UMTS standard). It should also be appreciated that one cell may include more than one base station and that base station apparatus may provide more than one access entity or cell.

The geographical location of the base stations is known. The geographical location of the base station and/or the mobile stations may defined, for example, in X and Y co-ordinates or in latitudes and longitudes. It is also possible to define the location of the base stations in vertical directions. For example, Z co-ordinate may be used when providing the location information in the vertical direction. The vertical location of the base stations may be needed e.g. in mountainous environments or in cities with tall buildings to be able to determine the location of a mobile station.

A location measurement unit (LMU) 20 is shown in association with selected sites i.e. base stations 4. The BTS sites that are provided with a LMU facility will be referred to in the following as LMU sites. The location measurement unit (LMU) is adapted to a accomplish measurements so that the location of the mobile station 7 may be determined based on the measurements. Some of the possible measurements by the location measurement units 20 were already discussed above. It should be appreciated that although the location measurement units 20 of FIG. 1 are shown to be attached to the base stations 4, it is possible to dispose the units 20 in a remote location and to connect the units to the respective base station or several base stations by an appropriate communication media such as by cabling or a suitable wireless connection.

Each of the base stations is connected to a network controller 10, which in the exemplifying PLMN system is a base station controller (BSC). The BSC may be a part of a GSM radio access network. The access network may also be referred to as base station subsystem (BSS). It should be appreciated that typically more than one controller is provided in a network. The controller 10 is connected to other network elements, such as to a mobile switching center MSC 11, a gateway node and a SGSN via suitable interconnections.

FIG. 1 also shows a location services (LCS) node 12 providing location services for different applications or clients 8. In general terms, the LCS node can be defined as an entity capable of providing information concerning the geographical location of a mobile station, and more particularly, the geographical location defined on the basis of the position of the mobile station relative to the base station(s) of the mobile telecommunications network. In the embodiment of FIG. 1 the node 12 comprises a gateway mobile location center (GMLC) that is provided in the core network side of the telecommunications system. A more detailed description of a possible location server can be found, for example, from ETSI (European telecommunications Standards Institute) technical specification "Location Services" (3GPP TS23.171 and GSM 03.71). The document is incorporated herein by reference.

The location service node 12 of FIG. 1 is implemented in the core network and is arranged to receive predefined information concerning the location of the mobile station 7 from the radio access network via MSC and/or SGSN 11 connected by the appropriate interface means 13 to the access network. The information received by the location server 12 may include the identity of the mobile station 7, the identity of the current cell, the identity of the service area (containing one cell or several cells) that is serving the mobile station and/or the RD measurement results by location measurement units 20. The server 12 processes this information and/or some other predefined parameters and/or computes by processor means 14 appropriate calculations for determining and outputting the geographical location of the given mobile station 7. The location server 12 may be arranged to request for the location information and/or the information may be "pushed" from the PLMN network side to the server. In addition, the location server 12 may define the accuracy that is desired. The required accuracy may be indicated e.g. by so called quality of service (QoS) parameters included in a location information request.

The LCS client 8 is a logical functional entity that makes a request to the LCS server node 12 for the location information of one or more target mobile stations. The LCS client 8 may be an entity that is external to the PLMN. The client 8 may also be an internal client (ILCS) i.e. reside in any entity (including a mobile station) within the PLMN. The LCS clients are entitled to receive at least some degree of information concerning the location (or location history) of the mobile station 7. The LCS server node 12 obtains positioning information from the access network side that is obtained using one or more of the appropriate techniques that will be briefly discussed below or any other suitable technique. This information may be processed in a predefined manner and is then provided to the LCS client 8. The particular requirements and characteristics of a LCS client 8 are preferably known to the LCS server by its LCS client subscription profile. The particular LCS-related restrictions associated with each target mobile station may also be detailed in the target mobile station subscription profile. The LCS Server 12 may also enable a network operator to charge LCS clients for the LCS features that the network operator provides.

The LCS server node 12 may consists of a number of location service components and bearers needed to serve the LCS clients 8. The LCS server node 12 may provide a platform which will enable the support of location based services in parallel with other telecommunication services such as speech, data, messaging, other teleservices, user applications and supplementary services. The LCS server node 12 responds to a location request from a properly authorised LCS client 8 with location information for the target mobile stations specified by the LCS client 8 if considerations of target mobile station privacy are satisfied. The LCS Server 12 may thus provide the client 8, on request, the current or most recent geographic location (if available) of the target mobile station or, if the location fails, an error indication and optionally the reason for the failure.

It should be appreciated that the above elements of the location service function are given as example only, and that the structure of the location information service may be different from the above described. The location information service may be implemented anywhere in the telecommunication system or in association with the telecommunication system. The location service implementation may be distributed between several elements.

The embodiments described in the following relate to the technique of LMU site selection for E-OTD method in a GSM network. The LMU site position planning is an important step when planning a location service for a network. A good LMU site means that this site shall qualify following conditions from the radio point of view: as many measured cells as possible; as good received signal level and interference level from the measured cells as possible; a LOS (line-of-sight) connection between the LMU site and the measured sites; minimum overlap between the measured sites and sites measured by other LMU sites. However, it should be appreciated that the manner how these requirements are applied while planning the network depends on the application.

The following conditions should also be taken into account so that the system may be realistic: any LMU capacity limitations (for example, there is a certain maximum number of cells that a LMU can measure); LMU coverage radius (the LMUs can only listen cells that are not too far); possible back slope effects (the LMU should listen to only those cells whose main slope is towards the LMU); impossible LMU site installations (e.g. difficult access to the base station or insufficient space for the LMU equipment) and so on.

The automatic LMU site selection process (ALSS) may take the radio part and the realistic part of the cell into account. The operator may also define parameters that he wishes to be taken into account. Based on the preconditions defined by operators, the ALSS may then automatically define the optimized position for a LMU and/or minimize the number of LMU units (i.e. LMU sites) required for the system.

Figure 2:
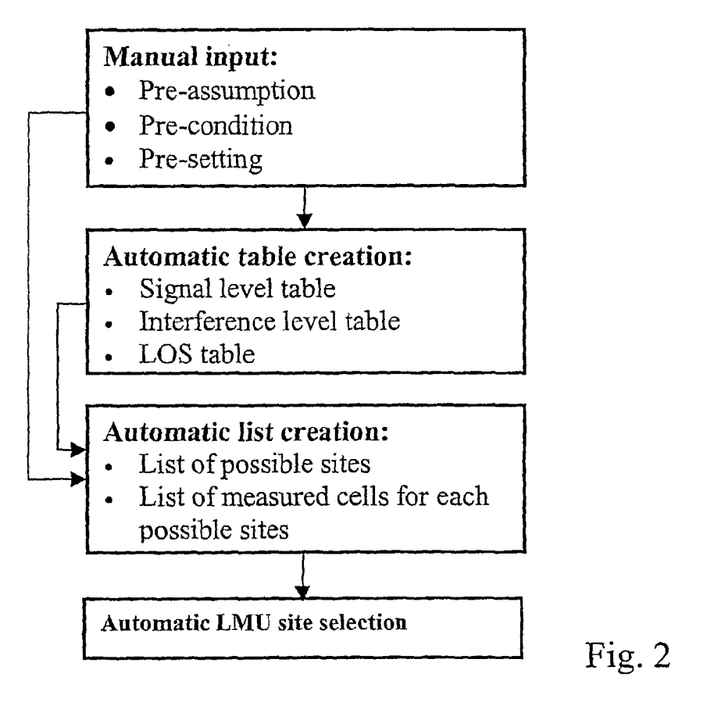
FIG. 2 is a flowchart illustrating the operation of one embodiment of the present invention.

The ALSS process may consist of four steps that are illustrated by the flowchart of FIG. 2. In the following embodiment input data for the selection process comprises information about the characteristics of the BTS sites and the cells in the area of interest. The input data may comprise information about the signal levels and/or interference levels and/or line-of-sight (LOS) at BTS sites from all cells. This information may be obtained based on known radio wave progression simulation techniques and/or geographical information that associates with the area or any other appropriate information. The LOS information may define which cells have a LOS and which cell do not have a LOS connection with the base station. This information may be inserted automatically into appropriate tables or similar records that associate the information with the respective base station. Other information, such as the possibility to insert new equipment and cell types (an outdoor cell, an indoor cell and so on) may also be fed into the selection process. In the selection process the sites with the best coverage are preferably selected one by one while also taking the already selected sites into consideration.

The first step of the LMU positioning process may be accomplished manually, while the rest of the three main steps can all be done automatically. In the first step the operator can define the parameters which might be used to facilitate a LMU site selection. The parameters may also be due to realistic constraints, e.g. due to difficult access to some of the base stations or lack of space for any auxiliary devices at the base station site. The manually input parameters are then preferably automatically used at the following steps. Some examples of the parameters are shown at the Table below.

TABLE

Examples of parameters at the first step

| | |
|---|---|
| Assumption | Other network related information is available (such as site coordinations, identifications etc.) |
| | Omni-directional LMU antenna/Beam shaped antenna |
| Pre-condition | List of sites that are not possible for the LMU installation (for example when the site has no space for new equipment or cannot be accessed) |

TABLE-continued

Examples of parameters at the first step

| | |
|---|---|
| Presetting | List of all necessary cells to be measured (there can be for example indoors cells, that in practise can not be measured, and that are not needed to be measured) LMU coverage capacity Back slopes filtered out (enable or disable) Radius of LMU coverage (what is the maximum allowed distance between the LMU and the measured cell) Threshold level for measured cells (the signal level at the LMU site should exceed this threshold value) |

In the next step ($2^{nd}$ step in FIG. 2) information tables may be automatically created based on information input at the first step. The following presents three possible tables.

Figure 3A:
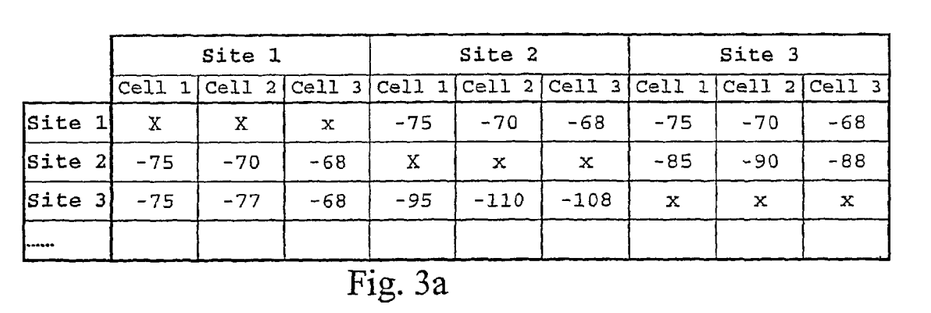
FIGS. 3a and 3b illustrate possible tables that may be created in the second step of the FIG. 2 flowchart.
Figure 3B:
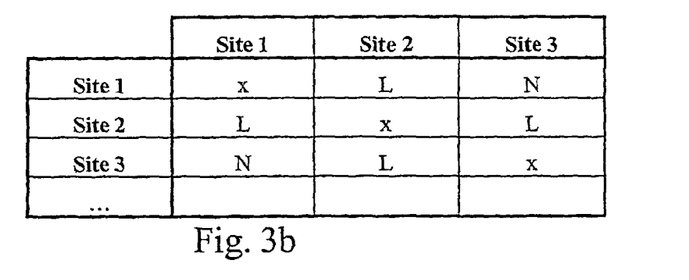

Tables for the information (1) and (3) are also shown in FIGS. 3a and 3b, respectively.

Possible tables:
(1) Signal level at the site from all cells;
(2) Interference level at site from all cells; and
(3) Line of sight between all sites.

The table of FIG. 3a gives the signal levels for an imaginary situation. The values given by the table indicate signal levels in dBs. x" simply designates that the cells within their own site are pre-selected in accordance with the above parameter "assumption", and thus no measurement data is required. If desired, it is also possible to measure the cells within the particular BTS site, in which case the "x" would be a numeric value, for example 60 dB.

The table of FIG. 3b indicates the LOS condition by two exemplifying categories. More particularly, L denotes a line of sight connection between the sites and N denotes a non-line of sight connection between the sites. It should be appreciated that the LOS condition can also be given as a numeric value and that any appropriate number of categories may be used. This is an implementation issue.

In the next (third) step of FIG. 2, two lists can be automatically created based on the previous steps:
(1) a list of possible LMU sites; and
(2) a list of measured cells for each possible site.

The list of possible sites lists all such LMU sites that may be used for the location measurements within the area that the planning procedure concerns. The second list indicates all such cells that have been measured for the possible sites as named by the list (1). In a practical implementation this may mean that all such cells are listed that the particular base station site may listen.

Figure 4:
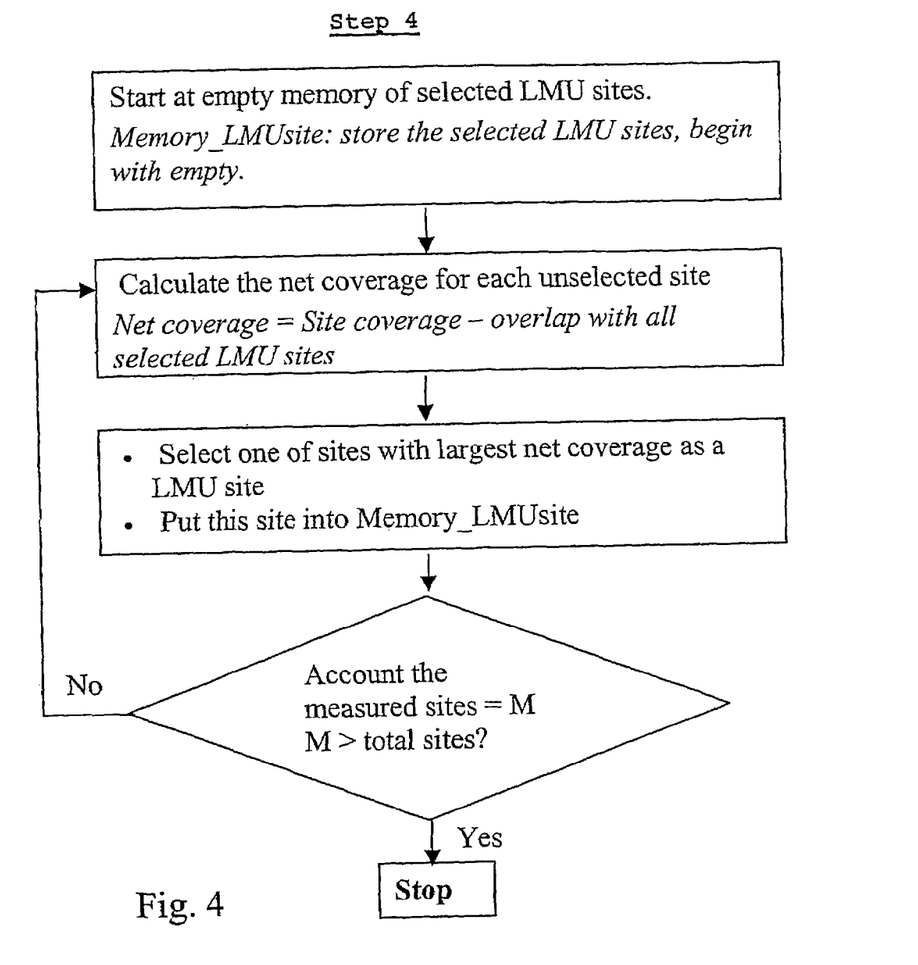
FIG. 4 is a flowchart illustrating in more detail the last step of the FIG. 2 flowchart.

Based on the third step, the LMU sites may be automatically selected in the next i.e. fourth step. A more detailed flowchart for a possible selection process is shown by FIG. 4. An example of the fourth step is also discussed with reference to FIGS. 5a to 5c and 6.

The automatic selection process of the fourth step needs a memory function for storing the selected LMU sites. In FIG. 4 the memory function is called 'memory_LMUsite'. At the beginning of the fourth step of FIG. 2, i.e. at the first step of FIG. 4, the memory is empty. In the next step the process will calculate a net coverage parameter for each unselected site.

The net coverage term may be defined as:
Net coverage=Site coverage−Overlap coverage, where 'Site coverage' denotes the number of the measured cells under the particular site and 'Overlap coverage' denotes the number of the measured cells which are covered with both the particular site and the selected sites that are stored in the memory.

In the next step or third step in FIG. 4 the process selects one of the sites with the largest net coverage as a possible LMU site and stores this selected site in the memory_LMUsite. It should be appreciated that some other selection criteria than the largest coverage area may be used, depending e.g. on the requirements set forth by the operator.

In the next step of the FIG. 4 process the number of the measured cells is accounted, the measured cells herein being the cells that are under the coverage of those LMU sites that are stored in the memory. If the accounted number M is equal with the total number of cells needed at the LCS service, or the accounted number is same as in the previous account, the process will stop. If not, the process may go back to the second step to continue or some other procedure may follow.

After the ALSS process is completed, a list of preferred LMU sites is automatically created. The LMU sites may be indicated e.g. by the base station identifications (BTS ID), site name or site number or any other appropriate identification for the selected BTS site.

Figure 5A:
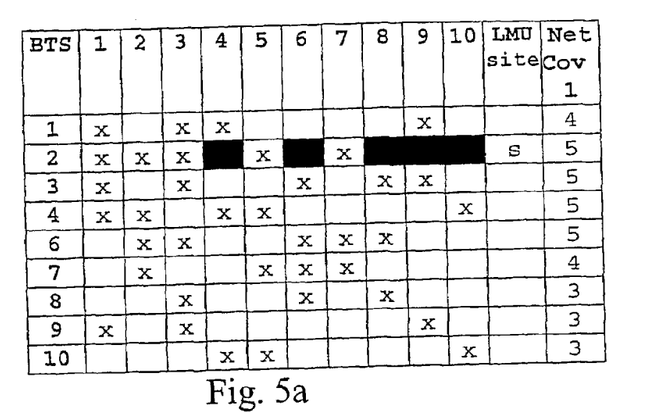
FIGS. 5a, 5b and 5c show examples of tables for use in the site selection process in accordance with FIG. 4.
Figure 5B:
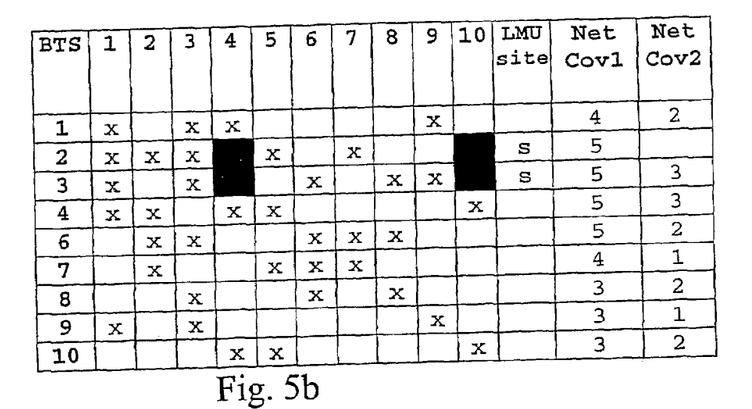
Figure 5C:
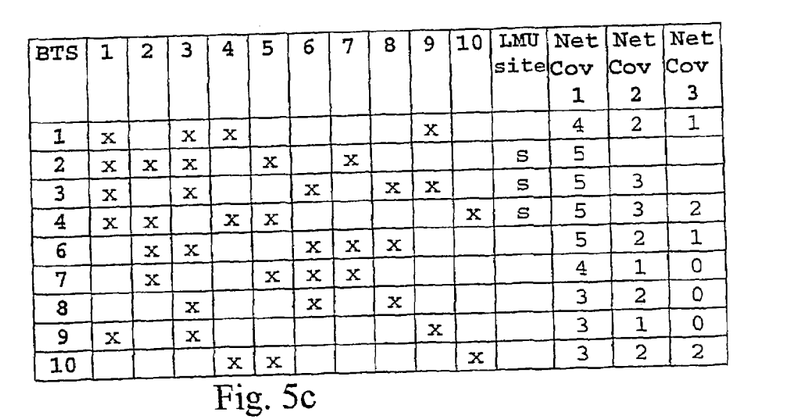
Figure 6:
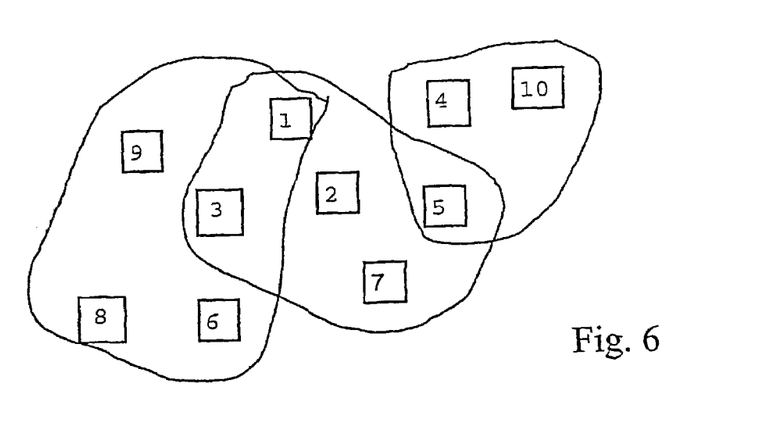
FIG. 6 illustrates the results obtained by means of the exemplifying tables of FIGS. 5a to 5c.

The following will discuss a more detailed example of an automatic LMU site selection process in accordance with the FIG. 4 process. An example of the resulting list (in the form of a table) of possible LMU sites is shown in FIG. 5c. FIG. 6 illustrates ten BTS sites and the resulting coverage area by three LMU sites that are selected by the exemplifying LMU site selection process cycle of FIGS. 5a to 5c.

As shown by FIG. 6, the exemplifying network includes 10 sites that are shown as boxes 1 to 10. A list of possible sites has been provided, e.g. by the third step of FIG. 2. A list of measured sites has also been provided for each possible site, e.g. based on the first and second steps of FIG. 2. To simplify the example, it is assumed that the cells within the same (BTS) site are synchronised. The table of FIG. 5a shows these two lists. The sites at the first column (i.e. the BTS column) are the possible sites. Site 5 is excluded since it is predefined as an impossible LMU site. The sites at the first row (i.e. the BTS row) are the measured sites.

The process of FIG. 4 is repeated until the predefined condition, such as 'M>total number of required LMU sites' is fulfilled. In the first cycle the net coverage is calculated for the column 'Net Cov'. The net coverage=total Coverage−overlap with the selected LMU sites. In the next step a site that has the largest (best) coverage is selected and stored into the memory as a possible LMU site. In the example site 2 is selected, since site 2 will cover sites 1, 2, 3, 5 and 7. The sites not covered by site 2 are indicated by black boxes.

As is shown by the table, sites 3, 4 and 6 cover also 5 sites. However, in this case the sites are defined to be selected in the order they appear on the table of FIG. 5a. However, the selection of the possible site may be based on some other criteria as well, such as in a site priority order or in an order that is defined by the installation flexibility or easiness, and so on. The selection criteria will preferably depend on the requirements and preferences by the network operators.

In the second cycle the Net coverage is calculated in a similar manner than in the $1^{st}$ cycle, but only for the non-selected sites, i.e. sites other than site 2 already selected as possible LMU site in the previous cycle. The site with the best Net coverage is selected and stored as a possible LMU site. In the example that would be site 3., since site 3 will cover sites 1, 3, 6, 8, 9.

Since there are still sites (4 and 10) that are not covered by the selected possible LMU sites, a third selection cycle is needed. The net coverage for the remaining sites is calculated, and a site with the best net coverage is selected and stored as a possible LMU site. In the example this would be site 4 covering sites 1, 2, 4, 5 and 10. As can be seen from FIG. 6, all sites of the ten (BTS) sites are covered after the above described three cycles, and the process may stop. Sites 2, 3 and 4 of FIG. 6 are selected as the LMU sites, since they provide the predefined coverage of the entire network consisting of ten BTS sites.

The following discloses an alternative selection algorithm (i.e. for the fourth step of the FIG. 2 embodiment). In this embodiment an initial guess of the number of LMU sites is made and the various LMU site combinations are systematically studied to find out the best combination of the LMU sites. The process is repeated by increasing the number of the LMU sites until a full or predefined coverage is obtained. It is possible that this embodiment may give a solution with a slightly smaller number LMU sites than the embodiment described with reference to FIGS. 4 to 6. However, it may be that this procedure requires more computation capacity, and may thus suit better for planning the LMU site selection for smaller areas.

Figure 7:
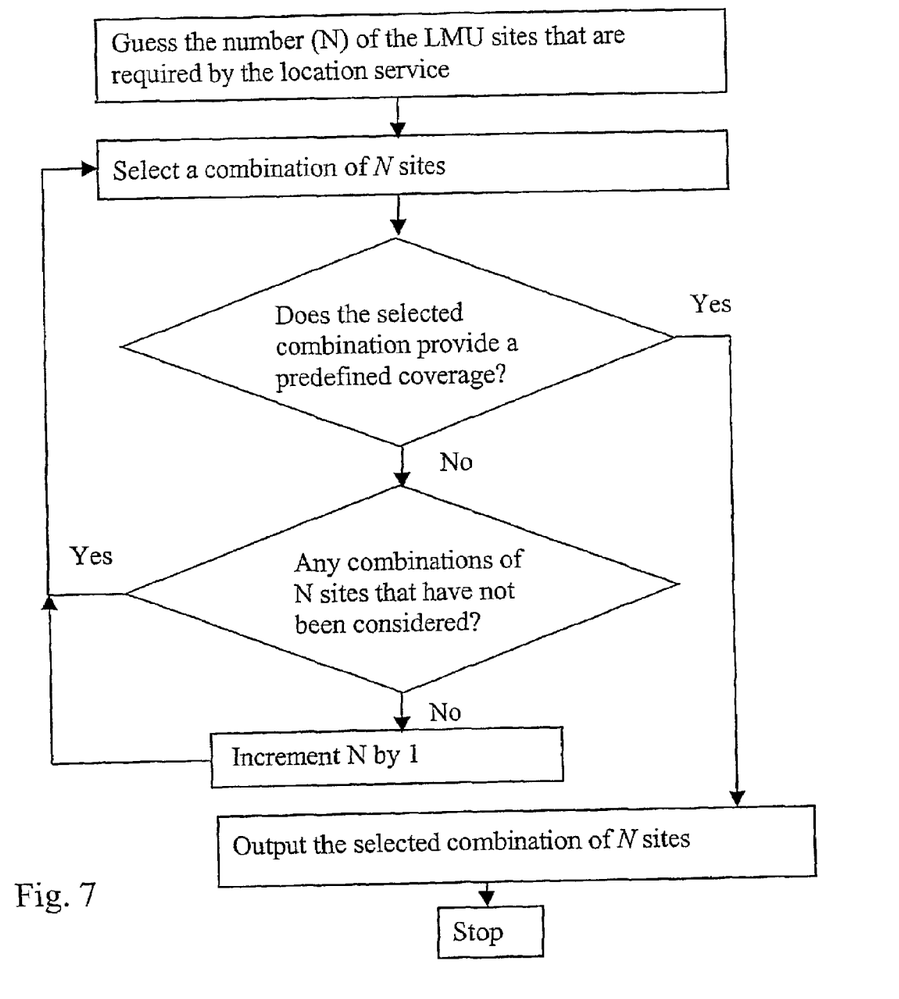
FIG. 7 is a flowchart illustrating the operation of an alternative embodiment of the present invention.

As shown by FIG. 7, an initial 'intelligent' guess of the required minimum number of the LMU sites for covering all necessary cells, $N=N_{initial}$, may be made in the beginning of the selection process. The process may also always start from a predefined number of sites, e.g. 10. There are also several other ways to obtain the initial number minimum number of the LMUs. One possible solution may be to divide the entire number of cells by an average of the expected number of cells measured by an LMU site.

In the next step a combination of N sites is selected among the possible LMU sites. It is checked whether the LMUs at these sites would cover all predefined cells. If this cannot be achieved, another combination is selected until a combination of N sites is found that fulfils the requirement, or all combinations on N LMU sites have been tried. If a solution is not found at all by the guessed number N of the LMU sites, the N may be increased by a predefined increment, e.g. by one. Thereafter a new combination of possible LMU sites is selected and the selection process is repeated until a solution is found.

Figure 8:
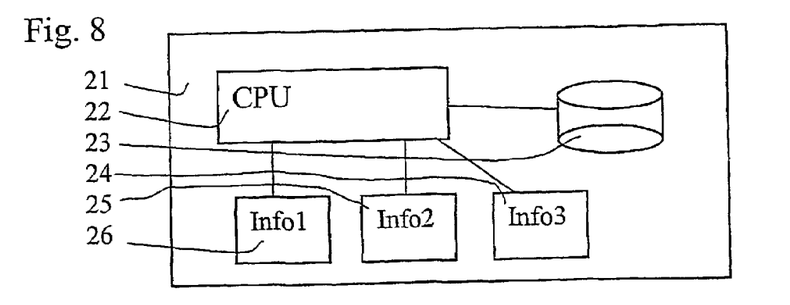
FIG. 8 is a schematic presentation of a processing unit in accordance with an embodiment of the present invention.

FIG. 8 shows schematic presentation of a processor architecture for an automatic processor unit 21 for accomplishing the LMU site selection process (ALSS). The planning tool comprises central processor unit (CPU) 22, that is adapted to define and/or use various sets of information, the information sets being shown by blocks 24 to 26 and to store and retrieve data from memory unit 23. The first set of information 26 relates to those sites that are possible locations for the location measurement units and to the coverage provided by the site if it is provided with a measurement unit. The second set of information 25 contains information of wireless connections within the coverage of the respective sites. Based on the first and second sets of information, the CPU may define the third set of information 24. In the third set of information each of the possible sites is associated with the access entities of the communication system that are covered by the respective possible site. The CPU means is also adapted to accomplish the selection process in accordance with one or several of the embodiments of the invention based on the information in the third set of information 24. It should be appreciated that although FIG. 8 shows a single processor unit and a memory, the various data processing and/or storing functions may be distributed among several processor entities.

Embodiments provide a method which may be used to optimise the number of LMUs. The automatic LMU site selection process (ALSS) of the embodiments may increase the efficiency of LMU site selection. Not only being an automatic process, the ALSS may also optimize the selection of the LMU sites since the ALSS process may be capable of automatically defining the most optimal positions for the LMU sites while minimising the number LMU units needed for an appropriate operation of the system.

The embodiments are described in the context of mobile station location in the GSM networks, but it should be appreciated that the embodiment may be used in any other location service that is based on measurements by means of selected ones of the network elements, such as by means of the base station sites. It should also be appreciated that whilst embodiments of the present invention have been described in relation to implementing a location service for mobile stations, embodiments of the present invention are applicable in the context of providing location service of any suitable type of wireless user equipment such as portable data processing devices or web browsers. In addition, the automatic and optimal LMU site selection process (ALSS) is described above with regard to co-site implementations. However, the embodiments may be used for positioning remote LMUs as well. At least some stages of the selection process may also be accomplished in an interleaved fashion or simultaneously. In addition, it may not be necessary to process all possible sites in each stage.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
    defining a first set of information that relates to one or more sites that are possible locations for a location measurer and a coverage provided by at least one of the sites if it is provided with a location measurer;
    defining a second set of information that relates to signaling conditions of the one or more sites and within the coverage of the one or more sites;
    based on the defined first and second sets of information, defining a third set of information that associates at least one of the possible sites with access entities of a communication system that are covered by said possible site; and
    based on the third set of information, selecting sites, using a processor, for the location measurers such that a predefined coverage is achieved, wherein the location measurers are configured to accomplish measurements that enable location of a wireless station that is located within at least one access entity of the communication system,
    wherein each of the location measurers is configured to provide a measurement coverage.

2. A method as claimed in claim 1, wherein the selection of the sites comprises:
    computing a measurement coverage for each of the possible sites;
    selecting at least one site that meets a predefined condition; and
    storing information of the selected at least one site.

3. A method as claimed in claim 2, wherein the site with the largest coverage is selected.

4. A method as claimed in claim 2, wherein the selecting of the sites further comprises:
    computing a net measurement coverage value for each of the non-selected possible sites, wherein the computing of the net measurement coverage value for a particular site is accomplished by subtracting the measurement coverage of the selected sites that overlaps with the measurement coverage of the particular site from the entire measurement coverage of the particular site;

selecting at least one site among the non-selected sites that meets a predefined condition;

storing information of the selected site; and repeating the net measurement coverage value computation until a predefined overall coverage by the selected sites is achieved.

5. A method as claimed in claim 4, wherein the site with the largest net coverage is selected.

6. A method as claimed in claim 4, wherein the predefined overall coverage is determined to be achieved after a predefined number of sites have been selected.

7. A method as claimed in claim 1, wherein the selecting of the sites comprises:

initiating the selection by defining an integer N that indicates the number of sites that is assumed to be required for a predefined measurement coverage;

selecting a combination of N sites; and determining if the selected combination provides the predefined measurement coverage.

8. A method as claimed in claim 7, wherein the selecting of the sites further comprises repeating the selection process until a combination of N sites is found that provides the predefined measurement coverage or all possible combinations of N sites have been considered.

9. A method as claimed in claim 7, wherein, if all possible combinations of N sites have been considered, the value of N is incremented by a predefined integer and the selection process is started from the beginning based on the incremented N value.

10. A method as claimed in claim 9, wherein the value of N is incremented by one.

11. A method as claimed in claim 1, wherein the location measurers are configured to measure a real time difference between two base station sites of the communication system.

12. A method as claimed in claim 1, wherein the location_measurers are to be associated with base stations of the communication system.

13. A method as claimed in claim 1, wherein the first set of information comprises one or more of information about the communication system, co-ordinates of the sites, type of the transmitter and/or receiver apparatus used by the sites, identities of the sites, information of any site that is excluded from the possible sites, information about possible cells of the communication system, information about the capacity of the location measurer, information about the radius of the measurer coverage, information of a threshold level for a cell measurement value.

14. A method as claimed in claim 1, wherein the second set of information comprises information of one or more of signal levels at each of the possible sites from all cells of the communication system, interference levels at each of the possible sites from all cells of the communication system, line of sight condition between the possible sites.

15. A method as claimed in claim 1, wherein the third set of information comprises a list of possible sites for a measurer and a list of cells that have been measured for each of the possible sites.

16. An apparatus, comprising:

at least one processor; and at least one memory including computer program code, wherein the at least one memory and the computer program code configured to, with the at least one processor, cause the apparatus to define a first set of information that relates to one or more sites that are possible locations for one or more location measurers and to a coverage provided by at least one of the sites if it is provided with a location measurer;

define a second set of information that relates to signaling conditions of the one or more sites and within a coverage of the one or more sites;

define, based on the first and second sets of information, a third set of information that associates at least one of the possible sites with access entities of a communication system that are covered by said possible sites; and select, based on the third set of information, sites for the location measurers such that a predefined coverage is achieved, wherein the location measurers are configured to accomplish measurements that enable location of a wireless station that is located within at least one access entity of the communication system, wherein each of the location measurers is configured to provide a measurement coverage.

17. An apparatus as claimed in claim 16, wherein the at least one processor is provided by a data processor.

18. An apparatus, comprising:

information storing means;

first processing means for defining a first set of information that relates to one or more sites that are possible locations for location measurers and to the coverage provided by at least one of the sites if it is provided with a location measurer;

second processing means for defining a second set of information that relates to signaling conditions of the one or more sites and within the coverage of the one or more sites;

third processing means for defining, based on the first and second sets of information, a third set of information that associates at least one of the possible sites with access entities of a communication system that are covered by said possible sites; and fourth processing means for selecting, based on the third set of information, sites for the location measurers such that a predefined coverage is achieved, wherein the location measurers are for accomplishing measurements that enable location of a wireless station that is located within at least one access entity of the communication system.

19. A computer readable storage medium encoded with instructions that, when executed by a computer, perform:

defining a first set of information that relates to one or more sites that are possible locations for a location measurer and a coverage provided by at least one of the sites if it is provided with a location measurer;

defining a second set of information that relates to signaling conditions of the one or more sites and within the coverage of the one or more sites;

based on the defined first and second sets of information, defining a third set of information that associates at least one of the possible sites with access entities of a communication system that are covered by said possible site; and based on the third set of information, selecting sites for the location measurers such that a predefined coverage is achieved, wherein the location measurers are configured to accomplish measurements that enable location of a wireless station that is located within at least one access entity of the communication system, wherein each of the location measurers is configured to provide a measurement coverage.

20. The computer readable storage medium as claimed in claim 19, wherein the selection of the sites comprises:
   computing a measurement coverage for each of the possible sites;
   selecting at least one site that meets a predefined condition; and
   storing information of the selected at least one site.

21. The computer readable storage medium as claimed in claim 20, wherein the site with the largest coverage is selected.

22. The computer readable storage medium as claimed in claim 20, wherein the selecting of the sites further comprises:
   computing a net measurement coverage value for each of the non-selected possible sites, wherein the computing of the net measurement coverage value for a particular site is accomplished by subtracting the measurement coverage of the selected sites that overlaps with the measurement coverage of the particular site from the entire measurement coverage of the particular site;
   selecting at least one site among the non-selected sites that meets a predefined condition;
   storing information of the selected site; and
   repeating the net measurement coverage value computation until a predefined overall coverage by the selected sites is achieved.

23. The computer readable storage medium as claimed in claim 22, wherein the site with the largest net coverage is selected.

24. The computer readable storage medium as claimed in claim 22, wherein the predefined overall coverage is determined to be achieved after a predefined number of sites have been selected.

25. The computer readable storage medium as claimed in claim 19, wherein the selecting of the sites comprises:
   initiating the selection by defining an integer N that indicates the number of sites that is assumed to be required for a predefined measurement coverage;
   selecting a combination of N sites; and
   determining if the selected combination provides the predefined measurement coverage.

26. The computer readable storage medium as claimed in claim 25, wherein the selecting of the sites further comprises repeating the selection process until a combination of N sites is found that provides the predefined measurement coverage or all possible combinations of N sites have been considered.

27. The computer readable storage medium as claimed in claim 25, wherein, if all possible combinations of N sites have been considered, the value of N is incremented by a predefined integer and the selection process is started from the beginning based on the incremented N value.

28. The computer readable storage medium as claimed in claim 27, wherein the value of N is incremented by one.

29. The computer readable storage medium as claimed in claim 19, wherein the location measurers are configured to measure a real time difference between two base station sites of the communication system.

30. The computer readable storage medium as claimed in claim 19, wherein the location$_{13}$measurers are to be associated with base stations of the communication system.

31. The computer readable storage medium as claimed in claim 19, wherein the first set of information comprises one or more of information about the communication system, co-ordinates of the sites, type of the transmitter and/or receiver apparatus used by the sites, identities of the sites, information of any site that is excluded from the possible sites, information about possible cells of the communication system, information about the capacity of the location measurer, information about the radius of the measurer coverage, information of a threshold level for a cell measurement value.

32. The computer readable storage medium as claimed in claim 19, wherein the second set of information comprises information of one or more of signal levels at each of the possible sites from all cells of the communication system, interference levels at each of the possible sites from all cells of the communication system, line of sight condition between the possible sites.

33. A method as claimed in claim 19, wherein the third set of information comprises a list of possible sites for a measurer and a list of cells that have been measured for each of the possible sites.

34. An apparatus as claimed in claim 16, wherein the at least one processor is further configured to:
   compute a measurement coverage for each of the possible sites;
   select at least one site that meets a predefined condition; and
   store information of the selected at least one site.

35. An apparatus as claimed in claim 34, wherein the site with the largest coverage is selected.

36. An apparatus as claimed in claim 34, wherein the at least one processro is further configured to:
   compute a net measurement coverage value for each of the non-selected possible sites, wherein the computing of the net measurement coverage value for a particular site is accomplished by subtracting the measurement coverage of the selected sites that overlaps with the measurement coverage of the particular site from the entire measurement coverage of the particular site;
   select at least one site among the non-selected sites that meets a predefined condition;
   store information of the selected site; and
   repeat the net measurement coverage value computation until a predefined overall coverage by the selected sites is achieved.

37. An apparatus as claimed in claim 36, wherein the site with the largest net coverage is selected.

38. An apparatus as claimed in claim 36, wherein the predefined overall coverage is determined to be achieved after a predefined number of sites have been selected.

39. An apparatus as claimed in claim 16, wherein the at least one processor is further configured to:
   initiate the selection of sites by defining an integer N that indicates the number of sites that is assumed to be required for a predefined measurement coverage;
   select a combination of N sites; and
   determine when the selected combination provides the predefined measurement coverage.

40. An apparatus as claimed in claim 39, wherein the at least one processor is further configured to repeat the selection process until a combination of N sites is found that provides the predefined measurement coverage or all possible combinations of N sites have been considered.

41. An apparatus as claimed in claim 39, wherein the at least one processor is further configured to, when all possible combinations of N sites have been considered, increment the value of N by a predefined integer and to start the selection process from the beginning based on the incremented N value.

42. An apparatus as claimed in claim 41, wherein the value of N is incremented by one.

43. An apparatus as claimed in claim 16, wherein the location measurers are configured to measure a real time difference between two base station sites of the communication system.

44. An apparatus as claimed in claim 16, wherein the location measurers are configured to be associated with base stations of the communication system.

45. An apparatus as claimed in claim 16, wherein the first set of information comprises one or more of information about the communication system, co-ordinates of the sites, type of the transmitter and/or receiver apparatus used by the sites, identities of the sites, information of any site that is excluded from the possible sites, information about possible cells of the communication system, information about the capacity of the location measurer, information about the radius of the measurer coverage, information of a threshold level for a cell measurement value.

46. An apparatus as claimed in claim 16, wherein the second set of information comprises information of one or more of signal levels at each of the possible sites from all cells of the communication system, interference levels at each of the possible sites from all cells of the communication system, line of sight condition between the possible sites.

47. An apparatus as claimed in claim 16, wherein the third set of information comprises a list of possible sites for a measurer and a list of cells that have been measured for each of the possible sites.

* * * * *